(12) United States Patent
Kim

(10) Patent No.: US 11,059,269 B2
(45) Date of Patent: Jul. 13, 2021

(54) HOT DIP COATED STEEL HAVING EXCELLENT PROCESSABILITY

(71) Applicant: POSCO, Pohang-si (KR)

(72) Inventor: Jin-You Kim, Pohang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/466,459

(22) PCT Filed: Dec. 19, 2017

(86) PCT No.: PCT/KR2017/015033
§ 371 (c)(1),
(2) Date: Jun. 4, 2019

(87) PCT Pub. No.: WO2018/117606
PCT Pub. Date: Jun. 28, 2018

(65) Prior Publication Data
US 2020/0070476 A1    Mar. 5, 2020

(30) Foreign Application Priority Data

Dec. 20, 2016    (KR) .................. 10-2016-0174584

(51) Int. Cl.
*B32B 15/01* (2006.01)
*C22C 38/48* (2006.01)
(Continued)

(52) U.S. Cl.
CPC ............ *B32B 15/013* (2013.01); *B32B 15/01* (2013.01); *B32B 15/012* (2013.01); *B32B 15/04* (2013.01); *B32B 15/043* (2013.01); *B32B 15/18* (2013.01); *C21D 6/004* (2013.01); *C21D 6/005* (2013.01); *C21D 6/008* (2013.01); *C21D 6/02* (2013.01); *C21D 8/02* (2013.01); *C21D 8/0205* (2013.01); *C21D 8/0226* (2013.01); *C21D 8/0247* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/40* (2013.01); *C22C 38/42* (2013.01); *C22C 38/44* (2013.01); *C22C 38/46* (2013.01); *C22C 38/48* (2013.01); *C23C 2/02* (2013.01); *C23C 2/04* (2013.01); *C23C 2/06* (2013.01); *C23C 2/12* (2013.01); *C23C 2/40* (2013.01); *C23C 28/023* (2013.01); *C23C 28/025* (2013.01);
(Continued)

(58) Field of Classification Search
CPC ..... B32B 15/013; B32B 15/012; B32B 15/01; B32B 15/04; B32B 15/043; B32B 15/18; C23C 30/00; C23C 30/005; C23C 2/04; C23C 2/06; C23C 2/12; C23C 2/02; C23C 2/40; C23C 28/025; C23C 28/023; C23C 28/3225; C23C 28/322; C21D 9/46; C21D 8/02; C21D 8/0205; C21D 8/0226; C21D 8/0247; C21D 6/004; C21D 6/005; C21D 6/008; C21D 2211/005; C21D 2211/004; C21D 6/02; C21D 8/0263; C22C 38/12; C22C 38/22; C22C 38/001; C22C 38/002; C22C 38/02; C22C 38/04; C22C 38/06; C22C 38/42; C22C 38/44; C22C 38/46; C22C 38/48; C22C 38/08; C22C 38/16; C22C 38/18; C22C 38/20; C22C 38/24; C22C 38/26; C22C 38/40; Y10T 428/12729; Y10T 428/12757; Y10T 428/12799; Y10T 428/12951; Y10T 428/12958; Y10T 428/12972

See application file for complete search history.

(56) References Cited

U.S. PATENT DOCUMENTS 6,221,179 B1    4/2001    Yasuhara et al.
2004/0238081 A1*  12/2004  Yoshinaga ............ C22C 38/002
148/603

(Continued)

FOREIGN PATENT DOCUMENTS

CN    1028834539 A    12/2012
CN    102906295 A    1/2013
(Continued)

OTHER PUBLICATIONS

Extended European Search Report dated Sep. 3, 2019 issued in European Patent Application No. 17884148.2.
(Continued)

*Primary Examiner* — Michael E. La Villa
(74) *Attorney, Agent, or Firm* — Morgan, Lewis & Bockius LLP

(57) ABSTRACT

Disclosed are a hot dip coated steel and a method for manufacturing the same, the hot dip coated steel comprising a hot rolled steel and a hot dip coated layer formed on the surface of the hot rolled steel, wherein the hot rolled steel comprises: by wt %, 0.05-0.15% of C, 0.5% or less of Si (excluding 0%), 0.5-1.5% of Mn, 0.01-0.05% of Nb, 0.005-0.05% of V, 0.03% or less of P (excluding 0%), 0.015% of S or less (excluding 0%), 0.05% or less of Al (excluding 0%), 0.01% or less of N (excluding 0%), and the balance of Fe and inevitable impurities; 90 area % or more of ferrite as the microstructure thereof; and 5,000-15,000/μm² of V-based precipitates.

8 Claims, No Drawings

(51) Int. Cl.

| | |
|---|---|
| *C22C 38/46* | (2006.01) |
| *C22C 38/44* | (2006.01) |
| *C22C 38/42* | (2006.01) |
| *C22C 38/06* | (2006.01) |
| *C22C 38/04* | (2006.01) |
| *C22C 38/02* | (2006.01) |
| *C22C 38/00* | (2006.01) |
| *C21D 9/46* | (2006.01) |
| *C21D 8/02* | (2006.01) |
| *C21D 6/00* | (2006.01) |
| *C23C 2/40* | (2006.01) |
| *C23C 2/02* | (2006.01) |
| *C22C 38/12* | (2006.01) |
| *C22C 38/22* | (2006.01) |
| *C23C 2/04* | (2006.01) |
| *C23C 2/06* | (2006.01) |
| *C23C 2/12* | (2006.01) |
| *C22C 38/16* | (2006.01) |
| *C23C 30/00* | (2006.01) |
| *C23C 28/02* | (2006.01) |
| *C22C 38/26* | (2006.01) |
| *C22C 38/20* | (2006.01) |
| *B32B 15/04* | (2006.01) |
| *C22C 38/08* | (2006.01) |
| *C22C 38/40* | (2006.01) |
| *C23C 28/00* | (2006.01) |
| *C22C 38/18* | (2006.01) |
| *C22C 38/24* | (2006.01) |
| *B32B 15/18* | (2006.01) |
| *C21D 6/02* | (2006.01) |

(52) U.S. Cl.
CPC ........ *C23C 28/322* (2013.01); *C23C 28/3225* (2013.01); *C23C 30/00* (2013.01); *C23C 30/005* (2013.01); *C21D 2211/004* (2013.01); *C21D 2211/005* (2013.01); *Y10T 428/12729* (2015.01); *Y10T 428/12757* (2015.01); *Y10T 428/12799* (2015.01); *Y10T 428/12951* (2015.01); *Y10T 428/12958* (2015.01); *Y10T 428/12972* (2015.01)

(56) References Cited

U.S. PATENT DOCUMENTS

| | | |
|---|---|---|
| 2013/0186523 A1 | 7/2013 | Ariga et al. |
| 2013/0192725 A1* | 8/2013 | Funakawa ............... C23C 2/28 148/537 |
| 2015/0004433 A1 | 1/2015 | Tanaka et al. |
| 2016/0348202 A1 | 12/2016 | Nakano |

FOREIGN PATENT DOCUMENTS

| | | |
|---|---|---|
| CN | 104114731 A | 10/2014 |
| CN | 104561775 A | 4/2015 |
| EP | 2746417 A1 | 6/2014 |
| JP | H06-264181 A | 9/1994 |
| JP | 2000-265244 A | 9/2000 |
| JP | 2002-12947 A | 1/2002 |
| JP | 2005-344167 A | 12/2005 |
| JP | 2007-270197 A | 10/2007 |
| JP | 2009-057620 A | 3/2009 |
| JP | 2014-31538 A | 2/2014 |
| JP | 2015-147960 A | 8/2015 |
| JP | 2015-187302 A | 10/2015 |
| KR | 10-2000-0068956 A | 11/2000 |
| KR | 10-0548864 B1 | 2/2006 |
| KR | 10-0972357 B1 | 7/2010 |
| KR | 10-1038472 B1 | 6/2011 |
| KR | 10-1196889 B1 | 11/2012 |
| KR | 10-2015-0076994 A | 7/2015 |
| KR | 10-2016-0104028 A | 9/2016 |
| WO | 2013/167572 A1 | 11/2013 |

OTHER PUBLICATIONS

International Search Report dated Mar. 29, 2018 issued in International Patent Application No. PCT/KR2017/015033 (with English translation).

Office Action issued in corresponding Chinese Patent Application No. 201780077822.1 dated Jul. 23, 2020, with English translation.

Office Action issued in corresponding Japanese Patent Application No. 2019-532942 dated Jul. 28, 2020, with English translation.

* cited by examiner

HOT DIP COATED STEEL HAVING EXCELLENT PROCESSABILITY

CROSS-REFERENCE OF RELATED APPLICATIONS

This application is the U.S. National Phase under 35 U.S.C. § 371 of International Patent Application No. PCT/KR2017/015033, filed on Dec. 19, 2017, which in turn claims the benefit of Korean Application No. 10-2016-0174584, filed on Dec. 20, 2016, the entire disclosures of which applications are incorporated by reference herein.

TECHNICAL FIELD

The present disclosure relates to a hot dip coated steel having excellent processability and a method for manufacturing the same, and particularly, to a hot dip coated steel having excellent processability and which could be preferably used in a rock bolt for tunnel and slope support, and a method for manufacturing the same.

BACKGROUND ART

Rock bolts are devices used for supporting tunnels and slopes (see Patent Documents 1 to 3), and it is required that strength of a material is excellent since it is necessary to support a significantly high load. Therefore, according to the related art, a hot rolled steel is mainly used as a material for such a rock bolt, the hot rolled steel has strength enhanced by adding a large amount of solid solution strengthening elements such as C, Si, Mn, Cr, or the like, or adding a large amount of precipitation strengthening elements such as Ti, Nb, V, Mo, or the like, in high purity steel with significantly reduced impurities in steel.

However, rock bolts are processed to have a horseshoe shape, and are then inserted into a support surface and are volume-expanded by hydraulic pressure. Here, during actual use, in the case of the hot rolled steel, in which a large amount of solid solution strengthening elements such as carbon (C), silicon (Si), manganese (Mn), chromium (Cr), or the like, or a large amount of precipitation strengthening elements such as titanium (Ti), niobium (Nb), vanadium (V), molybdenum (Mo), or the like, is added, a large amount of cracking may occur in a processed portion due to poor processability. In addition, the rock bolts pass through in a pipe making process during a manufacturing process. Here, in the case of the hot rolled steel, in which a large amount of solid solution strengthening elements such as C, Si, Mn, Cr, or the like, or a large amount of precipitation strengthening elements such as Ti, Nb, V, Mo, or the like, is added, weldability may poor because of a high carbon equivalent.

PATENT DOCUMENT (Patent Document 1) Korean Patent Registration No. 10-0972357
(Patent Document 2) Korean Patent Registration No. 10-1038472
(Patent Document 3) Korean Patent Registration No. 10-1196889

DISCLOSURE

Technical Problem

An aspect of the present disclosure may provide a hot dip coated steel having excellent processability and a method for manufacturing the same.

Technical Solution

According to an aspect of the present disclosure, a hot dip coated steel includes a hot rolled steel and a hot dip coated layer formed on the surface of the hot rolled steel, and the hot rolled steel includes 0.05 wt % to 0.15 wt % of carbon (C), 0.5 wt % or less of silicon (Si) (excluding 0 wt %), 0.5 wt % to 1.5 wt % of manganese (Mn), 0.01 wt % to 0.05 wt % of niobium (Nb), 0.005 wt % to 0.05 wt % of vanadium (V), 0.03 wt % or less of phosphorous (P) (excluding 0 wt %), 0.015 wt % or less of sulfur (S) (excluding 0 wt %), 0.05 wt % or less of aluminum (Al) (excluding 0 wt %), 0.01 wt % or less of nitrogen (N) (excluding 0%), and the balance of iron (Fe) and inevitable impurities, includes 90 area % or more of ferrite as the microstructure thereof, and includes 5,000 to 15,000 μm2 of V-based precipitates.

According to another aspect of the present invention, a method for manufacturing a hot dip coated steel includes: reheating a slab including 0.05 wt % to 0.15 wt % of carbon (C), 0.5 wt % or less of silicon (Si) (excluding 0 wt %), 0.5 wt % to 1.5 wt % of manganese (Mn), 0.01 wt % to 0.05 wt % of niobium (Nb), 0.005 wt % to 0.05 wt % of vanadium (V), 0.03 wt % or less of phosphorous (P) (excluding 0 wt %), 0.015 wt % or less of sulfur (S) (excluding 0 wt %), 0.05 wt % or less of aluminum (Al) (excluding 0 wt %), 0.01 wt % or less of nitrogen (N)(excluding 0 wt %), and the balance of Fe and inevitable impurities at 1100° C. to 1300° C.; obtaining a hot rolled steel by finish rolling at an austenite single phase temperature, after rough rolling the reheated slab; air-cooling for 1 to 5 seconds, after water-cooling the hot rolled steel to a temperature of 650° C. to 750° C. at a rate of 40° C./sec to 60° C./sec; coiling the air-cooled hot rolled steel at a temperature of 550° C. to 650° C.; and hot dip coating the coiled hot rolled steel after heat treatment for 1 to 5 minutes at a temperature of 500° C. to 650° C.

Advantageous Effects

As one of various effects of the present disclosure, the hot dip coated steel according to the present disclosure has an advantage of having an excellent balance of strength and ductility.

While various advantages and beneficial effects of the present inventive concept are not limited to the foregoing, it will be readily understood in the course of describing the specific embodiments of the present inventive concept.

BEST MODE FOR INVENTION

Hereinafter, one aspect of the present invention, a hot dip coated steel having excellent processability will be described in detail.

A hot dip coated steel according to an embodiment includes a hot rolled steel and a hot dip coated layer formed on a surface of the hot rolled steel. In the present disclosure, a composition of the hot dip coated layer is not particularly limited, and the hot dip coated layer may include at least one of Zn, Al and Mg (for example, Zn, Zn—Al, or Zn—Al—Mg), by way of example without limitation.

Hereinafter, the alloying element and a preferable content range of the hot rolled steel, a base material, will be described in detail. It is to be noted that the content of each element described below is based on weight unless otherwise specified.

Carbon (C): 0.05% to 0.15%

Carbon (C) is the most economical and effective element in securing strength. If the content of C is significantly low, it may be difficult to achieve the desired strength even if a precipitation strengthening element such as Nb is added. On the other hand, if the content of C is significantly excessive, ductility may be deteriorated due to excessive strength increase.

Silicon (Si): 0.5% or Less (Excluding 0%)

Although silicon (Si) contributes to the increase in strength by deoxidation of molten steel and solid solution strengthening, it is not intentionally added in the present disclosure, and there may be no problem in securing the material properties without addition of silicon. On the other hand, if the content of Si is significantly excessive, red scale, caused by Si, is formed on a surface of the hot rolled steel, resulting in deterioration of surface quality and deterioration of weldability.

Manganese (Mn): 0.5% to 1.5%

Manganese (Mn) is an effective element for solid solution strengthening of steel, and it is required to be added in an amount of 0.5% or more in order to secure proper strength. However, if the content of Mn is significantly excessive, there may be a risk of center segregation occurring in a continuous casting process.

Niobium (Nb): 0.01% to 0.05%

Niobium (Nb), as a precipitation strengthening element, is an element effective for securing strength while significantly reducing deterioration of ductility by generating niobium carbide (NbC)-based precipitates. Particularly, when a proper amount of Nb is added, an effect of strengthening yield strength is significant. In order to obtain such an effect in the present disclosure, Nb is preferably added in an amount of 0.01% or more. However, if the content of Nb is excessive, the economical efficiency may be deteriorated due to an increase in manufacturing costs. Considering this, the upper limit of Nb is preferably limited to 0.05%.

Vanadium (V): 0.005% to 0.05%

Vanadium (V) is also a precipitation strengthening element and is an effective element for securing the strength of steel. In order to obtain such an effect in the present disclosure, V is preferably added in an amount of 0.005% or more. However, if the content of V is excessive, toughness may be reduced. Considering this, the upper limit of V is preferably limited to 0.05%.

Phosphorus (P): 0.03% or Less (Excluding 0%)

Phosphorus (P) is an impurity inevitably contained in the steel, and it is preferable to control the content of P to be as low as possible. In detail, if the content of P is excessive, the risk of deterioration of weldability and brittleness of steel is increased, and the content of P is controlled to 0.03% or less in the present disclosure.

Sulfur (S): 0.015% or Less (Excluding 0%)

Sulfur (S) is an impurity inevitably contained in the steel, and it is preferable to control the content of P to be as low as possible. In detail, if the content of S is excessive, S may be combined with Mn to form a non-metallic inclusion, and the risk of brittleness of steel is increased. Here, the content of S is controlled to 0.015% or less in the present disclosure.

Aluminum (Al): 0.05% or Less (Excluding 0%)

Although aluminum (Al) contributes to the deoxidation of molten steel, it is not intentionally added in the present disclosure, and there may be no problem in securing the material properties without addition of aluminum. On the other hand, if the content of Al is excessive, a nozzle clogging phenomenon may occur during continuous casting, and the content of Al is controlled to 0.05% or less in the present disclosure.

Nitrogen (N): 0.01% or Less (Excluding 0%)

Although nitrogen (N) contributes to the strength improvement of the steel, it is not intentionally added in the present disclosure, and there may be no problem in securing the material properties without addition of nitrogen. On the other hand, if the content of N is excessive, the risk of brittleness of steel is increased, and the content of N is controlled to 0.01% or less in the present disclosure.

The rest other than the compositions is iron (Fe). Merely, in a common manufacturing process, unintended impurities may be inevitably mixed from surroundings, and thus, this may not be excluded. These impurities could be known by those skilled in the art, and therefore, all of the contents are not specifically mentioned in the present specification, but typical impurities are as follows.

Chromium (Cr): 0.05% or Less

Chromium (Cr) may help to form equiaxed ferrite by delaying phase transformation of bainite during cooling while solid solution strengthening steel. However, in the present disclosure, even if Cr is not added, there is no significant problem in securing material properties. On the other hand, if the content of Cr is excessive, the weldability is deteriorated, and the content of Cr is controlled to 0.05% or less in the present disclosure.

Nickel (Ni): 0.05% or Less

Nickel (Ni) serves to improve strength and toughness of steel simultaneously, but there may be no problem in securing the material properties without addition of Ni in the present disclosure. On the other hand, if the content of Ni is excessive, not only the economical efficiency is lowered but also the weldability is deteriorated, and the content of Ni is controlled to 0.05% or less in the present disclosure.

Molybdenum (Mo): 0.01% or Less

Molybdenum (Mo) serves to improve the yield strength by solid solution strengthening, and to improve the impact toughness by strengthening grain boundaries, but there may be no problem in securing the material properties without addition of Mo in the present disclosure. On the other hand, if the content of Mo is excessive, not only the economical efficiency is lowered but also the weldability is deteriorated, and the content of Mo is controlled to 0.01% or less in the present disclosure.

Copper (Cu): 0.01% or Less

Copper (Cu) serves to increase the strength by forming fine precipitates, but there may be no problem in securing the material properties without addition of Cu in the present disclosure. On the other hand, if the content of Cu is excessive, the hot workability and room temperature processability are deteriorated, and the content of Cu is controlled to 0.01% or less in the present disclosure.

Here, it is preferable to control a carbon equivalent (Ceq), defined by Equation 1, to 0.426 or less when designing an alloy of a steel material having the above-described element range. This is to secure a proper level of weldability.

$$Ceq=[C]+[Mn]/6+([Cu]+[Ni])/15+([Cr]+[Mo]+[V])/5 \quad \text{[Equation 1]}$$

Here, each of [C], [Mn], [Cu], [Ni], [Cr], [Mo], and [V] means the content of the element (weight %).

Hereinafter, the microstructure of the hot rolled steel, a base material, will be described in detail.

The hot rolled steel, the base material of the hot dip coated steel according to an embodiment, includes 5,000 to 15,000/$\mu m^2$ of V-based precipitates. If the number per unit area of V-based precipitates is less than 5,000/$\mu m^2$, sufficient strength may not be secured. On the other hand, if the number per unit area of V-based precipitates exceeds 15,000/$\mu m^2$, it may be difficult to secure sufficient ductility.

In the present disclosure, the specific type of the V-based precipitates is not particularly limited, but may be, for example, VC, VN, or V(C,N).

According to one example, an average diameter of the V-based precipitates may be 5 nm to 10 nm, and a maximum diameter thereof may be 20 nm or less. If the average diameter is less than 5 nm, the precipitates are generated at a relatively low temperature. In this regard, it may be difficult to secure the sufficient number per unit area. On the other hand, if the average diameter exceeds 10 nm, or the maximum diameter exceeds nm, a precipitation strengthening effect may not be sufficient due to coarse precipitates. Thus, it may be difficult to obtain sufficient strength. Here, an average diameter indicates an average equivalent circular diameter of V-based precipitates detected by observing a cross-section of the hot rolled steel in a thickness direction, and a maximum diameter indicates a maximum equivalent circular diameter of V-based precipitates detected by observing a cross-section of the hot rolled steel in a thickness direction.

In the present disclosure, a microstructure of the hot rolled steel, a base material, is not particularly limited, but for example, the hot rolled steel material, a base material, may include ferrite, pearlite, and bainite as microstructure. In this case, an area fraction of ferrite may be 90% or more. If the area fraction of ferrite is less than 90%, due to deterioration of processability, the possibility of cracking may be increased when a pipe is expanded after pipe making.

According to an example, an aspect ratio of ferrite may be 0.8 to 1.4. When the aspect ratio of ferrite is managed to the level described above, anisotropy of a material may be reduced, so it may be advantageous in processability in rock bolt pipe making and pipe expanding. If the aspect ratio of ferrite is less than 0.8 or exceeds 1.4, due to deterioration of processability, cracking may occur during pipe making and pipe expanding. On the other hand, the aspect ratio of ferrite may be obtained by Electron Backscatter Diffraction (EBSD). In more detail, the EBSD is measured 10 times at a random position at a magnification of 500 times, and the obtained data may averaged using a Grain Shape Aspect Ratio program basically provided by TSL OIM Analysis 6.0 software and the averaged value is used to obtain the aspect ratio of ferrite.

The hot dip coated steel according to the present disclosure has excellent strength and ductility. According to an example without limitation, in the hot dip coated steel according to the present disclosure, tensile strength is 450 MPa to 650 MPa, yield strength is 400 MPa to 600 MPa, and elongation is 25% to 35%.

The hot dip coated steel according to the present disclosure has excellent processability. According to an example without limitation, the product of yield strength and elongation may be 12,000 MPa·% to 15,000 MPa·%.

The hot dip coated steel according to the present disclosure described above may be manufactured using various methods, and the manufacturing method thereof is not particularly limited. However, as a preferable example, the hot dip coated steel may be manufactured by the following method.

Hereinafter, another aspect of the present disclosure, a method for manufacturing a hot dip coated steel having excellent processability will be described in detail.

First, a slab having the above-described component is reheated at a temperature of 1100° C. to 1300° C. If a reheating temperature is less than 1100° C., the rolling load may become significant in a hot rolling process, a subsequent process. On the other hand, if the reheating temperature exceeds 1300° C., due to the partial coarsening caused by the abnormal growth of some austenite grains, a grain size of the final microstructure may be uneven. On the other hand, in the present disclosure, the slab reheating time is not particularly limited, and it may be a conventional condition. As an example without limitation, the slab reheating time may be 100 to 400 minutes.

Then, after rough rolling the reheated slab, finish rolling is performed at an austenite single phase temperature to obtain a hot rolled steel.

Here, rough rolling indicates a series of intermediate rolling processes performed before finish rolling. In the present disclosure, specific conditions of the rough rolling are not particularly limited, and it may be conventional conditions. As an example without limitation, a thickness of a rough-rolled slab to a thickness of a reheated slab may be 10% to 25%, and a rough rolling temperature may be set to a temperature which is sufficiently high to secure a finish rolling temperature.

Finish rolling is performed at an austenite single phase temperature, in order to increase the uniformity of a structure.

According to an example, during hot rolling, a finish rolling temperature may be 800° C. to 900° C. During final hot rolling in the temperature range described above, an austenite structure of the hot rolled steel, finish rolled, has an average grain size of 10 μm to 40 μm. If the finish rolling temperature is less than 800° C., hot rolling load is increased, so productivity may be lowered. On the other hand, if the finish rolling temperature exceeds 900° C., an austenite grain of a slab may be coarsened, so it may be difficult to secure the desired processability.

Then, the hot rolled steel is cooled. In this case, if the hot rolled steel is cooled through conventional continuous cooling, it may be difficult to sufficiently secure the equiaxed ferrite, and the needle-like ferrite may be excessively formed to deteriorate the ductility. In this regard, in the present disclosure, the hot rolled steel is water-cooled to a temperature of 650° C. to 750° C. at a rate of 40° C./sec to 60° C./sec, and is then air-cooled for 1 to 5 seconds. As described above, the hot rolled steel is cooled by two-stage cooling.

Here, a temperature of 650° C. to 750° C. is a temperature at which ferrite is transformed the most quickly, and corresponds to a temperature at which the equiaxed ferrite grows the most efficiently. Hereinafter, the temperature of 650° C. to 750° C. is referred to as an intermediate temperature. A more preferable intermediate temperature range is 680° C. to 720° C.

If the intermediate temperature exceeds 750° C., or the air-cooling time exceeds 5 seconds, the equiaxed ferrite may be formed, but the ferrite may grow excessively, resulting in deterioration of yield strength. On the other hand, if the intermediate temperature is less than 650° C., or the air-cooling time is less than 1 second, it may be difficult to form the equiaxed ferrite, resulting in deterioration of ductility. In addition, if the air-cooling time exceeds 5 seconds, the NbC precipitates may be coarsened. Thus, an effect of the fine NbC precipitates generated during coiling may be lowered, and it may be difficult to secure the desired processability.

If a cooling rate is less than 40° C./sec during water-cooling, it may be difficult to secure the sufficient air-cooling time in the run-out-table (ROT) cooling section. On the other hand, if the cooling rate exceeds 60° C./sec, due to a significantly fast cooling rate, it may be difficult to secure the desired intermediate temperature.

If a temperature of the hot rolled steel after air-cooling exceeds a target coiling temperature, before the air-cooled hot rolled steel is coiled, the air-cooled hot rolled steel is water-cooled at a rate of 40° C./sec to 60° C./sec to the target coiling temperature. Here, the reason for limiting the cooling rate is to secure a proper coiling temperature after the intermediate temperature.

Then, the cooled hot rolled steel is coiled at a temperature of 550° C. to 650° C. A more preferable coiling temperature range is 600° C. to 650° C. The temperature range described above is a temperature range in which NbC precipitates are generated the most quickly. Thus, when coiling is performed in the temperature range described above, NbC precipitates are precipitated finely, so yield strength lowered by the formation of the equiaxed ferrite may be compensated. If the coiling temperature exceeds 650° C., coarse pearlite is formed to reduce yield strength, and NbC precipitates are coarsened and it may be difficult to secure target processability. If the coiling temperature is less than 550° C., crystal grains become finer and yield strength is increased, but ductility may be deteriorated. In addition, if the content of fine NbC precipitates is reduced, it may be difficult to secure target processability.

Then, the coiled hot rolled steel is heat-treated for 1 to 5 minutes at a temperature of 500° C. to 650° C. In this case, a more preferable heat treatment temperature range is 550° C. to 600° C., a further more preferable heat treatment temperature range is 550° C. to 590° C., and a more preferable heat treatment temperature time range is 2 to 4 minutes.

In this heat treatment process, residual NbC precipitates are precipitated, and V(C,N) precipitates are precipitated finely. Thus, due to a precipitation strengthening effect, the strength of steel is improved. If a heat treatment temperature is less than 500° C., or a heat treatment temperature is less than 1 minute, it may be difficult to sufficiently precipitate V-based precipitates. On the other hand, if the heat treatment temperature exceeds 650° C. or the heat treatment temperature exceeds 5 minutes, productivity may be deteriorated.

Then, the heat treated hot rolled steel is hot dip coated to manufacture a hot dip coated steel.

[Mode for Invention]

Embodiments in the present disclosure will hereinafter be described in more detail. However, the description of these embodiments is intended only to illustrate the practice of the present disclosure, but the present disclosure is not limited thereto. The scope of the present disclosure is determined based on the matters claimed in the appended claims and modifications rationally derived therefrom.

The slab having the composition illustrated in Tables 1 and 2 was reheated at 1150° C. for 200 minutes, and was then rough rolled and finish rolled under the conditions in Table 3 to obtain the hot rolled steel. In this case, in all examples, a thickness of a rough-rolled slab to a thickness of a reheated slab is constant, such as, 20%. Then, the hot rolled steel was water-cooled to an intermediate temperature of Table 3 at a rate of 50° C./sec, and was then air-cooled for 5 seconds and was coiled at a coiling temperature of Table 3. The case in which continuous cooling is described in the intermediate temperature of Table 3 is the case in which continuous cooling is performed to a coiling temperature without air-cooling. Meanwhile, when a temperature of the air-cooled hot rolled steel did not reach the coiling temperature of Table 3, additional water-cooling was performed at a rate of 50° C./sec to a coiling temperature. Then, the coiled hot rolled steel was heat-treated for 2 minutes at a heat treatment temperature of Table 3, and then hot dip galvanizing was performed.

Then, a microstructure of the manufactured hot-rolled plated steel was analyzed, mechanical properties were evaluated, and the results are shown in Table 4 below. For reference, in all examples, the remainder other than ferrite was pearlite and/or bainite.

TABLE 1

| Steel | Alloy composition (wt %) | | | | | | |
|---|---|---|---|---|---|---|---|
| | C | Si | Mn | Nb | V | P | S |
| Inventive Steel 1 | 0.08 | 0.01 | 1.4 | 0.03 | 0.008 | 0.01 | 0.004 |
| Inventive Steel 2 | 0.07 | 0.01 | 1.2 | 0.03 | 0.008 | 0.01 | 0.004 |
| Comparative Steel 1 | 0.04 | 0.01 | 1.2 | 0.03 | 0.003 | 0.01 | 0.004 |
| Comparative Steel 2 | 0.16 | 0.01 | 1.2 | 0.025 | 0.003 | 0.01 | 0.004 |
| Comparative Steel 3 | 0.23 | 0.01 | 0.8 | 0.005 | 0.001 | 0.01 | 0.004 |

TABLE 2

| Steel | Alloy composition (wt %) | | | | | | |
|---|---|---|---|---|---|---|---|
| | Al | N | Cr | Ni | Mo | Cu | Ceq |
| Inventive Steel 1 | 0.025 | 0.005 | 0.015 | 0.01 | 0.001 | 0.001 | 0.33 |
| Inventive Steel 2 | 0.025 | 0.005 | 0.015 | 0.01 | 0.001 | 0.001 | 0.27 |
| Comparative Steel 1 | 0.025 | 0.005 | 0.015 | 0.01 | 0.001 | 0.001 | 0.24 |
| Comparative Steel 2 | 0.025 | 0.005 | 0.015 | 0.01 | 0.001 | 0.001 | 0.36 |
| Comparative Steel 3 | 0.025 | 0.005 | 0.015 | 0.01 | 0.001 | 0.001 | 0.37 |

TABLE 3

| Steel | Finish rolling temperature (° C.) | Intermediate temperature (° C.) | Coiling temperature (° C.) | Heat treatment temperature (° C.) | Note |
|---|---|---|---|---|---|
| Inventive Steel 1 | 840 | 680 | 630 | 550 | Inventive Example 1 |
| | 830 | 620 | 630 | 550 | Comparative Example 1 |
| | 840 | 680 | 630 | 450 | Comparative Example 2 |
| | 840 | Continuous cooling | 630 | 550 | Comparative Example 3 |
| Inventive Steel 2 | 830 | 680 | 640 | 550 | Inventive Example 2 |
| | 830 | 610 | 630 | 550 | Comparative Example 4 |
| | 840 | 680 | 580 | 550 | Comparative Example 5 |
| | 840 | 680 | 630 | 700 | Comparative Example 6 |
| | 830 | Continuous cooling | 640 | 550 | Comparative Example 7 |
| Comparative Steel 1 | 840 | 680 | 630 | 550 | Comparative Example 8 |
| Comparative Steel 2 | 840 | 680 | 630 | 550 | Comparative Example 9 |
| Comparative Steel 3 | 830 | 680 | 640 | 550 | Comparative Example 10 |

TABLE 4

| | Ferrite | | V-based precipitates | | | Mechanical properties | | | | |
|---|---|---|---|---|---|---|---|---|---|---|
| | Area | | | Average | Maximum | | | | | |
| Steel | ratio (%) | Aspect ratio | Number (number/μm$^2$) | diameter (nm) | diameter (nm) | YS (MPa) | TS (MPa) | El (%) | YS × El (MPa · %) | Note |
| Inventive Steel 1 | 93 | 1.19 | 12,000 | 7 | 9 | 463 | 523 | 27 | 12501 | Inventive Example 1 |
| | 89 | 1 | 14,000 | 5 | 8 | 468 | 532 | 24 | 11232 | Comparative Example 1 |
| | 92 | 1.15 | 4,000 | 3 | 7 | 443 | 512 | 27 | 11961 | Comparative Example 2 |
| | 88 | 0.74 | 12,000 | 6 | 9 | 463 | 523 | 24 | 11112 | Comparative Example 3 |
| Inventive Steel 2 | 95 | 1.3 | 12,000 | 6 | 10 | 458 | 513 | 28 | 12824 | Inventive Example 2 |
| | 90 | 1.1 | 13,000 | 5 | 7 | 458 | 531 | 25 | 11450 | Comparative Example 4 |
| | 93 | 1.3 | 14,000 | 6 | 8 | 453 | 521 | 25 | 11325 | Comparative Example 5 |
| | 93 | 1.21 | 4,000 | 14 | 23 | 432 | 510 | 27 | 11664 | Comparative Example 6 |
| | 89 | 0.75 | 12,000 | 6 | 9 | 463 | 523 | 24 | 11112 | Comparative Example 7 |
| Comparative Steel 1 | 95 | 1.32 | 3,500 | 7 | 9 | 384 | 463 | 29 | 11136 | Comparative Example 8 |
| Comparative Steel 2 | 80 | 0.7 | 4,500 | 7 | 10 | 453 | 523 | 23 | 10419 | Comparative Example 9 |
| Comparative Steel 3 | 73 | 0.62 | 1,600 | 8 | 12 | 389 | 532 | 22 | 8558 | Comparative Example 10 |

As can be seen in Table 4, in the case of Inventive Examples 1 and 2, satisfying both the alloying composition and the manufacturing conditions proposed in the present disclosure, the product of strength and elongation was 12,000 MPa·% or more, and the balance of strength and ductility was significantly excellent.

On the other hand, in the case of Comparative Examples 1 to 11, at least one of the alloying composition and the manufacturing conditions is deviated from the conditions proposed in the present disclosure, and the balance of strength and elongation was poor.

The invention claimed is:

1. A hot dip coated steel, comprising a hot rolled steel and a hot dip coated layer formed on a surface of the hot rolled steel,
   wherein the hot rolled steel includes 0.05 wt % to 0.15 wt % of carbon (C), 0.5 wt % or less of silicon (Si) (excluding 0 wt %), 0.5 wt % to 1.5 wt % of manganese (Mn), 0.01 wt % to 0.05 wt % of niobium (Nb), 0.005 wt % to 0.05 wt % of vanadium (V), 0.03 wt % or less of phosphorous (P) (excluding 0 wt %), 0.015 wt % or less of sulfur (S) (excluding 0 wt %), 0.05 wt % or less of aluminum (Al) (excluding 0 wt %), 0.01 wt % or less of nitrogen (N) (excluding 0%), and the balance of iron (Fe) and inevitable impurities, includes 90 area % or more of ferrite as the microstructure thereof, and includes 5,000 to 15,000/μm$^2$ of V-based precipitates.

2. The hot dip coated steel of claim 1, wherein an average diameter of the V-based precipitates is 5 nm to 10 nm.

3. The hot dip coated steel of claim 1, wherein a maximum diameter of the V-based precipitates is 20 nm or less.

4. The hot dip coated steel of claim 1, wherein an aspect ratio of the ferrite is 0.8 to 1.4.

5. The hot dip coated steel of claim 1, wherein the balance other than the ferrite is at least one of pearlite and bainite.

6. The hot dip coated steel of claim 1, wherein the inevitable impurities includes chromium (Cr), nickel (Ni), molybdenum (Mo), and copper (Cu), and are suppressed to 0.05 wt % or less (excluding 0%) of Cr, 0.05 wt % or less (excluding 0%) of Ni, 0.01 wt % or less (excluding 0%) of Mo, and 0.01 wt % or less (excluding 0%) of Cu.

7. The hot dip coated steel of claim 1, wherein the hot dip coated layer includes at least one of zinc (Zn), Al, and magnesium (Mg).

8. The hot dip coated steel of claim 1, wherein the product of yield strength and elongation is 12,000 MPa % to 15,000 MPa %.

* * * * *